Sept. 18, 1962          H. A. MALE          3,054,332

SPIRAL BEVEL AND HYPOID GEAR CUTTING MACHINE

Filed Feb. 6, 1961          2 Sheets-Sheet 1

INVENTOR.
HERMAN A. MALE
BY *Richard W. Treverton*
ATTORNEY

Sept. 18, 1962        H. A. MALE        3,054,332
SPIRAL BEVEL AND HYPOID GEAR CUTTING MACHINE
Filed Feb. 6, 1961        2 Sheets-Sheet 2

United States Patent Office 3,054,332
Patented Sept. 18, 1962

3,054,332
SPIRAL BEVEL AND HYPOID GEAR CUTTING MACHINE
Herman A. Male, Rochester, N.Y., assignor to The Gleason Works, Rochester, N.Y., a corporation of New York
Filed Feb. 6, 1961, Ser. No. 87,315
21 Claims. (Cl. 90—9.4)

The present invention relates to a machine for cutting non-generated spiral bevel and hypoid gears, the primary objective being a machine of improved rigidity, simplicity and compactness.

In contrast with conventional machines of this kind, wherein the work spindle and cutter spindle are horizontal, according to the present invention the axis of one spindle, preferably the work spindle, is inclined at an acute angle to the horizontal. The other spindle is also inclined, being perpendicular to an adjustment axis for the head or housing in which it is journaled, and such adjustment axis being perpendicular to the first mentioned axis and parallel to the vertical plane containing said first mentioned axis. The heads in which the two spindles are respectively journaled are also relatively movable horizontally, there being in the preferred embodiment of the invention provision for relative horizontal adjustment of them in a direction perpendicular to said vertical plane and also for relative horizontal movement of them in said plane. The heads are also relatively adjustable in the direction of one, and preferably both, of the first mentioned axis and said adjustment axis.

A preferred embodiment of the invention is shown in the accompanying drawings, wherein.

Figure 1:
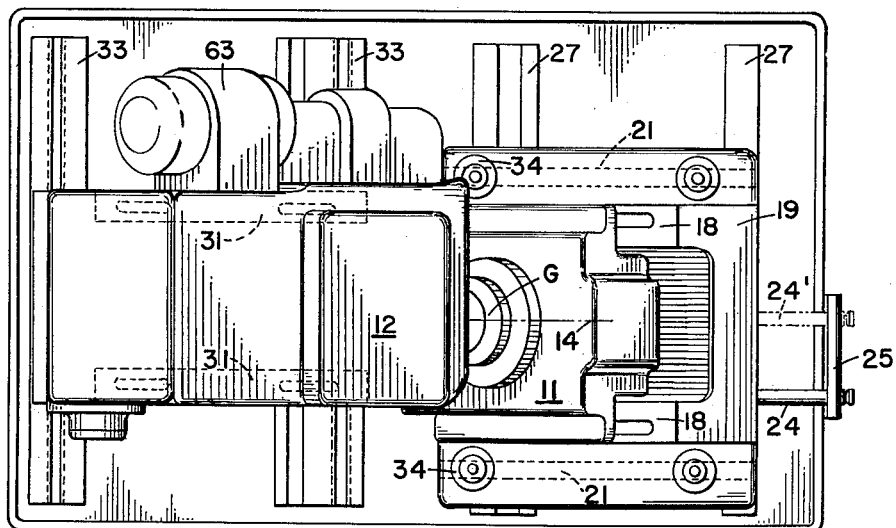
FIGS. 1 and 2 are plan and side views respectively of the machine, a portion of the latter view being in vertical section.

The illustrated machine comprises a frame 10 which indirectly supports a work head 11 and a cutter head 12. A work spindle 13 is rotatable in the work head about axis 14 which is inclined to the horizontal at an angle of forty-five degrees, the upper end of the spindle carrying a chuck 15 for a work gear G. The cutter head 12 journals a spindle 16 for both rotation and axial motion. Mounted on the lower end of this spindle there is a face mill cutter C which may be of the kind disclosed in co-pending application Serial No. 781,516, filed December 19, 1958, by L. O. Carlsen et al., now patent No. 2,994,943, granted Aug. 8, 1961. The axis 17 of the cutter spindle lies in an inclined plane parallel to axis 14.

Figure 2:
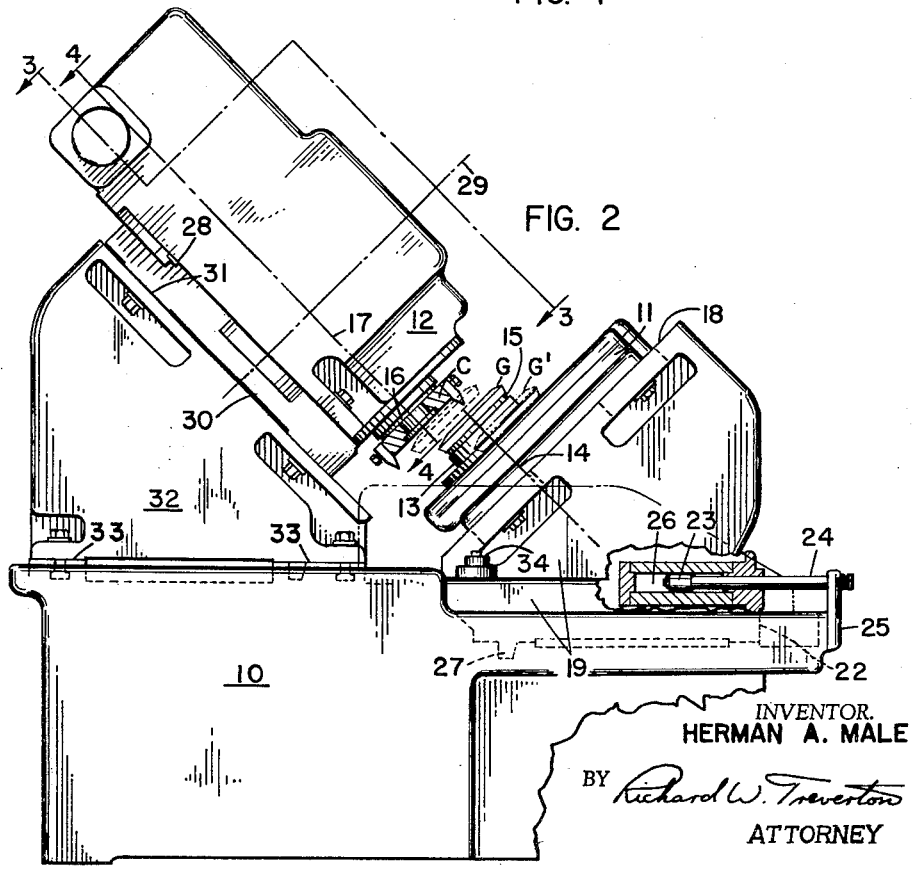

The work head 11 is adjustable in the vertical plane containing the axis 14 in a direction perpendicular to that axis, such adjustment being along inclined guide ways 18 on a work slide 19. The latter is movable horizontally along guide ways 21 on a plate 22 in a direction longitudinal of the machine, i.e. in the direction of the vertical plane containing axis 14. This movement is for the purpose of shifting a work gear G mounted on the spindle 13 between a loading position, indicated in broken lines at G' in FIG. 2, and the cutting position in which it appears in dotted lines in the same view. The movement is effected by a hydraulic piston 23 secured by a rod 24 to a bracket 25 on the frame, the piston being in a cylinder 26 provided in the slide 19. The piston-cylinder device is controlled by a suitable reversing valve, not shown.

Figure 3:
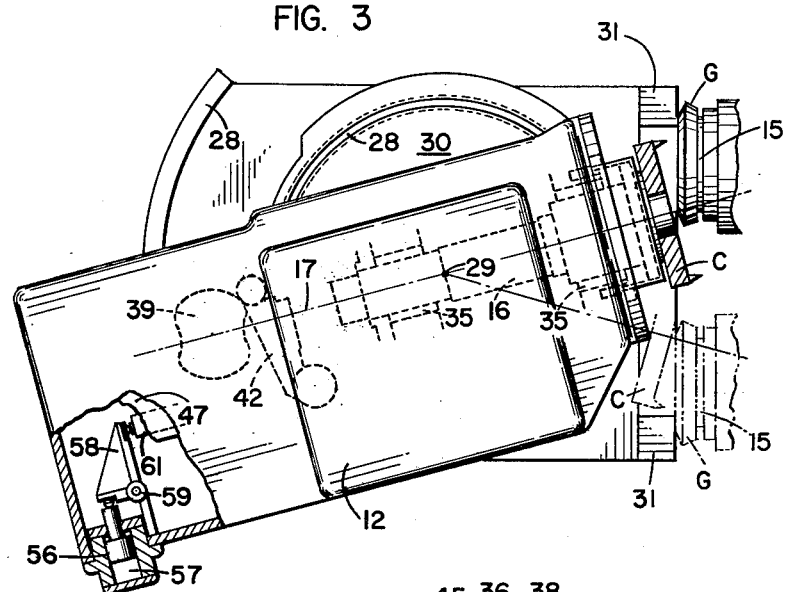
FIG. 3 is an oblique view, partly in section, as indicated by section line 3—3 in FIG. 2.

The plate 22 is adjustable transversely of the machine, along horizontal ways 27 on the frame, between either of two positions, respectively for cutting gears of right and left hand spiral. In FIG. 3 the relation of the cutter C to a gear G of right hand spiral is shown in full lines, while for a gear of left hand spiral is shown in broken lines. In FIG. 1 the plate 22 and piston rod 24 are shown as positioned for a gear of left hand spiral. For gears of the opposite hand of spiral the plate is shifted to bring the piston rod to the position shown in broken lines at 24'. The bracket 25 is adapted for connection to the rod in either position.

Cutter head 12 is angularly adjustable along circular guide ways 28, about axis 29, on a slide 30. Axis 29 is parallel to ways 18, is perpendicular to spindle axes 14 and 17, and intersects axis 17. Slide 30 is adjustable in a direction parallel to axis 14 along inclined guide ways 31 on a column 32. The latter is adjustable transversely of the machine along horizontal guide ways 33 on the frame.

By the several adjustments of the work head and cutter head referred to above, a spiral bevel or hypoid gear of any design within the range of the machine may be brought into proper position for cutting by cutter C. Such adjustments are made in a usual manner by adjusting screws, not shown. The adjusted parts are then firmly secured, by conventional clamp screws, some of which appear in the drawings. During operation of the machine after such adjustment the only motions of the cutter C and spindle 16 are rotation and axial motion, and the only motions of the gear G and work spindle 13 are an indexing motion about axis 14 to bring successive tooth spaces of the gear into position for cutting, and the horizontal motion effected by piston-cylinder device 23, 26 to carry the gear between loading and cutting positions. During actual cutting the slide is clamped to the plate by hydraulic slide clamps 34. The latter may be like those shown in FIG. 8 of L. O. Carlsen et al. Patent 2,947,223.

Figure 4:
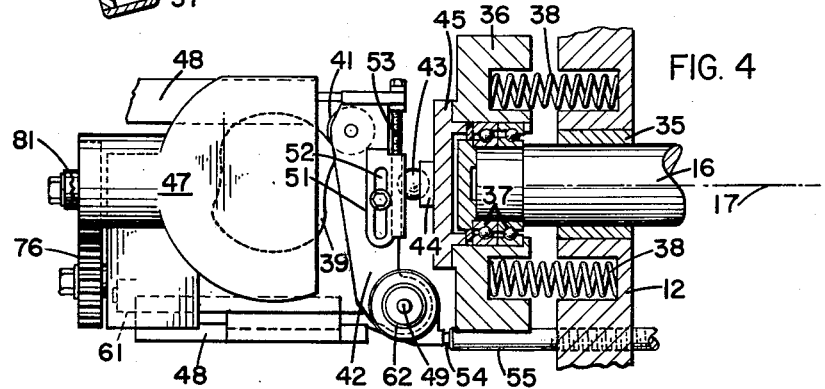
FIG. 4 is a detail view, partly in section in plane 4—4 of FIG. 2.

The cutter spindle 16 is mounted for rotation and axial motion in bearings 35, FIGS. 3 and 4, in head 12. A bearing block 36 is connected to the inner end of the spindle by antifriction bearings 37 and is constantly urged in a direction to withdraw the cutter from the work gear by springs 38, of which there are eight arranged around axis 17. The block 36 is held against rotation but is guided for motion along axis 17 by suitable means, not shown, carried by the head 12. Axial motion of the cutter spindle is effected by a rotary cam 39 which acts on a follower roller 41 carried by a lever 42, the lever acting through a ball 43 and block 44 against a plane pressure plate 45 secured to bearing block 36. The springs 38 act to hold the follower roller against the cam.

Figure 5:
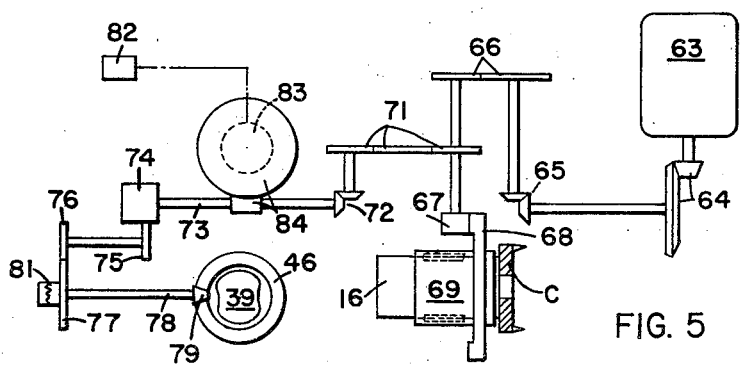
FIG. 5 is a drive diagram of the machine.

The cam 39 is secured to a bevel gear 46, FIG. 5, and is rotatably supported on a cam slide 47 that is mounted for motion along guide ways 48 in the head 12, in a direction parallel to axis 17. The lever 42 is fulcrumed on the cam slide on axis 49 and has adjustable thereon a block 51 which carries ball 43. Adjustment of the block 51, to vary the distance of ball 43 from the fulcrum, and thereby vary the axial stroke of the spindle 16 due to rotation of cam 39, is by means of a screw 53. A screw extending into the lever, through a slot 52 in the block, secures the latter in adjusted position.

The forward limit position of cam slide 47, FIG. 4, is determined by abutment of a stop 54 thereon with a manually adjustable screw 55 which is threaded into head 12. This adjustment is employed to compensate for changes in the length of the blades of cutter C due to wear and resharpening. The slide is held in its forward limit position by a hydraulic piston 56 in a cylinder 57 in head 12, the stem of the piston abutting a lever 58 which is pivoted to the head at 59 and bears upon an abutment 61 on the slide. When hydraulic pressure in cylinder 57 is released, by a suitable valve, not shown, the springs 38 effect withdrawal of the slide (and also of the spindle 16 and cutter C) to the extent permitted by travel of the piston 56. The valves for cylinders 57 and 26 are so related that retraction of the cutter occurs prior to withdrawal of the work slide by piston-cylinder device 23, 26, FIG. 2, at the conclusion of the cutting of a gear, and that the subsequent advance of the work slide precedes that of the cutter. During actual cutting the cam slide is clamped to head 12 by a hydraulic clamp 62 which is coaxial with the fulcrum of the lever 42. This clamp may be operated simultaneously with clamps 34, and by the same valve (not shown).

The cutter C and cam 39 are driven by a motor 63 which is shown in FIGS. 1 and 5 but is omitted from FIG. 3. The motor is mounted on the cutter head 12 and drives the cutter through bevel reduction gears 64 (FIG. 5), bevel gears 65, cutter speed change gears 66, and hypoid pinion and gear 67, 68. The gear 68 is on a sleeve 69 which is journaled for rotation in head 12 and is keyed to the spindle to enable the latter to be moved axially as it rotates. Cam 39 is driven from the shaft of pinion 67 through gears 71, bevel gears 72, shaft 73, gears 74, 75, change gears 76, 77, shaft 78 and bevel pinion 79 and gear 46. A fine tooth clutch 81 releaseably connects gear 77 to shaft 78, to enable adjustment of the phase relation between cam 39 and cutter C. By exchange of gears 76, 77 the number of turns of cam 39 per revolution of the cutter may be varied to suit the design of the cutter.

A typical cutter for finish cutting teeth with helicoidal tooth sides may have eight blades and two empty adjacent blade spaces to provide an indexing gap. Such a cutter requires ten axial reciprocations per revolution of the cutter, and inasmuch as the cam 39 has two lobes, the ratio of gears 76, 77 in this case must be such as to provide five turns of the cam for each revolution of the cutter. The typical cutter has alternate inside and outside cutting blades, for respectively cutting the convex and concave sides of the gear teeth, and the lobes of the cam may be designed either to provide for axial advance of the cutter in constant velocity ratio to cutter rotation while each blade cuts, or one or both of the lobes may be designed to provide for a slight change in this velocity ratio, to modify the tooth curvature. The effect of such modification is described in co-pending patent application Serial No. 705,931, filed on December 30, 1957, by L. O. Carlsen et al.

Indexing of the work spindle, to bring successive tooth spaces of the work gear into cutting position, occurs each time the gap in the rotating cutter comes abreast of the gear. Such indexing may be effected by means described in co-pending application of Norman W. Fowler and myself, Serial No. 87,314, filed on even date herewith, entitled "Index Mechanism." Such a mechanism, indicated diagrammatically at 82 in FIG. 5, may be controlled by an electric switch actuated by a cam 83 driven by shaft 73 through reduction gears 84.

The machine described above is for finish cutting gears whose tooth slots have been rough cut on another machine. The roughing machine may be essentially the same except for the cutter-reciprocating cam and the drive gearing for the cutter spindle and the cam. The roughing cam is preferably of the single lobe type and provides for withdrawal of the cutter from one tooth slot of the work gear prior to indexing to bring the next tooth space into cutting position, and the gearing is such that the cutter, which may be of a conventional face mill type, makes a number of revolutions while being fed into the gear blank subsequent to each indexing operation.

In comparison with a conventional machine of equal capacity and rigidity, the machine arrangement herein described has the advantages of requiring substantially less floor space and of being substantially lighter in weight, or, conversely, of being more rigid for a given weight, owing to the compactness of the frame and reduction in horizontal overhang of the cutter and work. By adjustment of the cutter head about axis 29 to either side of its central position, and transverse adjustment of the work head between the two positions described, gears of either right or left hand spiral and of a wide range of spiral angle, cone angle and diameter may be accommodated on a machine of relatively small transverse dimension.

Having described the improved machine and its operation, I claim as my invention:

1. A machine for cutting spiral bevel or hypoid gears with a face mill cutter, comprising a frame supporting a work head and a cutter head, the work head being adjustable rectilinearly relative to the frame in a vertical plane in a direction inclined at an acute angle to the horizontal, a work spindle rotatable in the work head about an axis which lies in said plane and is perpendicular to said direction, said spindle being adapted to support a workpiece on the upper end thereof, the cutter head being angularly adjustable on the frame about an axis extending in said direction, a cutter spindle rotatable in the cutter head about an axis perpendicular to said axis of angular adjustment, the cutter head being adjustable rectilinearly on the frame toward and away from the work head in a plane perpendicular to said direction, and said heads being supported on the frame for horizontal movement relative to each other in the direction of said perpendicular plane.

2. A machine according to claim 1 in which the work head is supported for said rectilinear adjustment thereof on a slide which is reciprocable on the frame to provide for said relative movement between the heads.

3. A machine according to claim 1 in which the cutter head is mounted for the angular adjustment thereof upon a slide which is adjustable relative to the frame in the direction of the work spindle axis.

4. A machine according to claim 1 in which the cutter spindle is movable axially in the cutter head for cutter infeed and withdrawal.

5. A machine according to claim 1 in which said heads are supported on the frame for adjustment relative to each other in a direction perpendicular to said vertical plane.

6. A machine according to claim 1 in which said acute angle is approximately forty-five degrees.

7. A machine for cutting spiral bevel or hypoid gears with a face mill cutter, comprising a frame, a work slide reciprocable horizontally on the frame in a direction longitudinal thereof to carry a workpiece between cutting and loading positions, a work head adjustable rectilinearly on the slide in a vertical plane and at an acute angle to the direction of slide movement, a work spindle journaled in the work head on an axis in a vertical plane and perpendicular to the direction of the work head adjustment, said spindle being adapted to support a workpiece on the upper end thereof, a cutter column on the frame, a cutter slide adjustable rectilinearly on the column in a vertical plane and at right angles to the direction of adjustment of the work head on the work slide, a cutter head adjustable on the cutter slide about an axis in a vertical plane and parallel to said direction of adjustment of the work head, and a cutter spindle rotatable in the cutter head on an axis perpendicular to said axis of adjustment of the cutter head and movable along its axis of rotation for cutter infeed and withdrawal.

8. A machine according to claim 7 in which there is a horizontal relative adjustment between the work slide and the cutter column in a direction transverse of the frame.

9. A machine according to claim 8 in which said relative adjustment is by adjustment of the cutter column on the frame.

10. A machine according to claim 9 in which the horizontal reciprocation of the work slide is upon a plate that is adjustable horizontally on the frame in a direction transverse thereof.

11. A machine according to claim 7 in which there is a piston-cylinder device connected between the frame and the work slide for reciprocating the latter.

12. A machine according to claim 7 in which there is an indexing mechanism for the work spindle in said work head, and means operable in time with said mechanism for withdrawing and advancing the cutter spindle in the cutter head along its rotation axis.

13. A machine according to claim 12 in which said means for withdrawing and advancing the cutter spindle comprises a rotary cam.

14. A machine according to claim 12 in which said means for withdrawing and advancing the cutter spindle comprises a slide connected to the spindle and movable rectilinearly in the cutter head in the direction of said rotation axis, and a piston-cylinder device for effecting such movement.

15. A machine according to claim 7 in which there is a rotary cam carried by the slide in the cutter head, a lever pivoted to the slide and having a follower engaging said cam, the lever being arranged to effect axial advance of the spindle, and spring means to effect axial withdrawal of the spindle and maintain the follower against the cam.

16. A machine according to claim 15 in which the cam is geared to the cutter spindle to rotate in time therewith.

17. A machine according to claim 16 in which the index mechanism and said piston-cylinder device are operably connected to said cam for operation in time therewith.

18. A machine for cutting spiral bevel or hypoid gears with a face mill cutter, comprising a frame, a work slide reciprocable horizontally on the frame to carry a workpiece between cutting and loading positions, a work head adjustable rectilinearly on the slide in a vertical plane and at an acute angle to the horizontal, a work spindle journaled in the work head on an axis in a vertical plane and perpendicular to the direction of work head adjustment on the slide, said spindle being adapted to support a workpiece on the upper end thereof, a cutter column on the frame, a cutter slide adjustable rectilinearly on the column in a vertical plane and at right angles to the direction of adjustment of the work head on the work slide, a cutter head adjustable on the cutter slide about an axis in a vertical plane and parallel to said direction of adjustment of the work head, and a cutter spindle rotatable in the cutter head on an axis which intersects the axis of adjustment of the cutter head at right angles and movable along its axis of rotation for cutter infeed and withdrawal.

19. A machine according to claim 18 in which the cutter column is adjustable rectilinearly on the frame in a horizontal direction perpendicular to said vertical plane, there is a plate slidably supporting the work slide for the reciprocation thereof on the frame, and said slide is adjustable on the frame in a direction parallel to the direction of adjustment of the cutter column, to enable the vertical plane containing the work spindle to be disposed to either side of the vertical plane which contains the axis of adjustment of the cutter head.

20. A machine for cutting spiral bevel or hypoid gears with a face mill cutter, comprising a frame supporting a work head and a cutter head which respectively have a work spindle and a cutter spindle rotatable therein, one spindle being rotatable in its head about a first axis which lies in a vertical plane and is inclined at an acute angle to the horizontal, the head having the other spindle being angularly adjustable on the frame about a second axis parallel to said vertical plane and perpendicular to said first axis, said other spindle being rotatable in its head about a third axis perpendicular to said second axis, and said heads being supported on the frame for (*a*) rectilinear horizontal adjustment relative to each other in a direction perpendicular to said vertical plane, and (*b*) rectilinear adjustment relative to each other in a direction parallel to one of said first and second axes.

21. A machine according to claim 20 in which said heads are supported on the frame also for rectilinear horizontal movement relative to each other in the direction of said vertical plane.

References Cited in the file of this patent
UNITED STATES PATENTS

| | | |
|---|---|---|
| 1,590,466 | Logue | June 29, 1926 |
| 2,947,223 | Carlsen et al. | Aug. 2, 1960 |